(12) United States Patent
Gaddam et al.

(10) Patent No.: US 11,870,348 B1
(45) Date of Patent: Jan. 9, 2024

(54) HIGH SPEED, LOW QUIESCENT CURRENT COMPARATOR

(71) Applicant: Empower Semiconductor, Inc., Milpitas, CA (US)

(72) Inventors: Narendra Nath Gaddam, Milpitas, CA (US); Trey Roessig, Palo Alto, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 71 days.

(21) Appl. No.: 17/406,429

(22) Filed: Aug. 19, 2021

Related U.S. Application Data (60) Provisional application No. 63/071,771, filed on Aug. 28, 2020.

(51) Int. Cl.
*H02M 3/158* (2006.01)
*G05F 1/62* (2006.01)

(52) U.S. Cl.
CPC ............ *H02M 3/1582* (2013.01); *G05F 1/62* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285;
(Continued)

(56) References Cited

U.S. PATENT DOCUMENTS

6,100,667 A * 8/2000 Mercer ................... H02J 7/342
320/164
6,154,064 A * 11/2000 Proebsting ............. G11C 7/062
327/55
(Continued)

*Primary Examiner* — Kevin J Comber
*Assistant Examiner* — Nusrat Quddus
(74) *Attorney, Agent, or Firm* — Kilpatrick Townsend & Stockton LLP (57) ABSTRACT

An integrated circuit device includes: an input stage configured to receive first and a second input signals and generate a first voltage based on the first input signal and generate a second voltage based on the second input signal; an amplification stage configured to generate a first output current based on the first voltage and a second output current based on the second voltage; a bias stage configured to generate a bias voltage for the amplification stage based on the first and second voltages; a load stage configured to output a differential voltage signal proportional to a current through a device for which current is sensed based on a comparison of the first and second output currents; and an output stage configured to output a signal to control a duty cycle of the device for which current is sensed.

20 Claims, 6 Drawing Sheets

(58) Field of Classification Search
CPC .... H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; H02J 3/46; H02J 3/38
See application file for complete search history.

(56) References Cited

U.S. PATENT DOCUMENTS

| | | | | |
|---|---|---|---|---|
| 6,236,254 B1* | 5/2001 | Morgan | H03F 1/56 | 348/E5.068 |
| 6,340,909 B1* | 1/2002 | Zerbe | H03L 7/0812 | 327/256 |
| 7,170,267 B1* | 1/2007 | McJimsey | H02M 3/156 | 323/285 |
| 7,327,130 B1* | 2/2008 | Giannopoulos | H02M 3/1588 | 323/275 |
| 7,495,423 B1* | 2/2009 | Knight | H02M 3/1588 | 323/259 |
| 7,598,715 B1* | 10/2009 | Hariman | H02M 3/1588 | 323/222 |
| 7,612,615 B1* | 11/2009 | Hou | H03F 3/3022 | 330/297 |
| 7,643,322 B1* | 1/2010 | Varga | H02M 3/156 | 307/66 |
| 8,018,215 B1* | 9/2011 | Griesert | H02M 3/158 | 323/224 |
| 8,319,553 B1* | 11/2012 | Ivanov | H03F 3/456 | 330/253 |
| 8,576,589 B2* | 11/2013 | Melanson | H02M 3/33592 | 363/49 |
| 8,901,980 B1* | 12/2014 | Naish | H03K 3/3565 | 327/205 |
| 9,590,604 B1* | 3/2017 | Li | H03K 5/24 | |
| 9,780,763 B1* | 10/2017 | Lu | H03K 5/24 | |
| 9,912,295 B1* | 3/2018 | Miao | H03F 3/195 | |
| 10,243,520 B2* | 3/2019 | Barbieri | H03F 3/45197 | |
| 11,073,857 B1* | 7/2021 | Liberti | H03K 17/6871 | |
| 11,088,677 B1* | 8/2021 | Wu | H03F 3/45 | |
| 11,099,589 B1* | 8/2021 | Laur | H02M 3/156 | |
| 11,264,982 B2* | 3/2022 | Terenzi | B06B 1/0253 | |
| 11,502,654 B2* | 11/2022 | Danyuk | H03F 3/45384 | |
| 11,543,439 B1* | 1/2023 | Chew | G01R 19/10 | |
| 2001/0030577 A1* | 10/2001 | Stephens | H03F 3/45475 | 330/207 A |
| 2004/0046605 A1* | 3/2004 | Granville | H03F 3/005 | 330/9 |
| 2007/0200599 A1* | 8/2007 | Ajram | H03K 5/003 | 327/65 |
| 2007/0236188 A1* | 10/2007 | Gibson | H02M 3/1563 | 323/225 |
| 2009/0066301 A1* | 3/2009 | Oswald | H02M 3/1582 | 323/351 |
| 2009/0096489 A1* | 4/2009 | Ying | H02M 1/32 | 327/103 |
| 2009/0146620 A1* | 6/2009 | Ng | H02M 3/156 | 323/222 |
| 2010/0060257 A1* | 3/2010 | Azrai | G01R 19/0092 | 324/76.11 |
| 2011/0062929 A1* | 3/2011 | Strydom | H02M 3/158 | 323/284 |
| 2012/0025796 A1* | 2/2012 | Kahn | H02M 3/156 | 323/272 |
| 2012/0155127 A1* | 6/2012 | Brokaw | H02M 1/36 | 363/49 |
| 2012/0169419 A1* | 7/2012 | Dufr ne | H03D 7/1441 | 330/157 |
| 2012/0249093 A1* | 10/2012 | Grbo | H02M 3/1588 | 323/234 |
| 2013/0002212 A1* | 1/2013 | Fan | H02M 3/156 | 323/235 |
| 2013/0021009 A1* | 1/2013 | Waltman | H02M 3/1584 | 323/271 |
| 2013/0043877 A1* | 2/2013 | Tang | H03F 3/45475 | 330/261 |
| 2013/0063113 A1* | 3/2013 | Couleur | H02M 3/1588 | 323/282 |
| 2013/0069718 A1* | 3/2013 | Ivanov | H03F 3/45928 | 330/69 |
| 2013/0307511 A1* | 11/2013 | De Vries | H02M 3/1563 | 323/284 |
| 2014/0022014 A1* | 1/2014 | Reisiger | H03F 3/45928 | 330/253 |
| 2014/0225588 A1* | 8/2014 | Malinowski | G05F 3/262 | 323/316 |
| 2014/0292298 A1* | 10/2014 | Pradhan | H02M 3/1588 | 323/286 |
| 2014/0327480 A1* | 11/2014 | Nys | H03F 3/45475 | 330/2 |
| 2014/0347078 A1* | 11/2014 | Qin | G01R 19/0092 | 324/713 |
| 2015/0084694 A1* | 3/2015 | Lee | H03F 1/483 | 327/170 |
| 2015/0145588 A1* | 5/2015 | Chao | G05F 3/262 | 327/513 |
| 2015/0200592 A1* | 7/2015 | Chang | H02M 3/156 | 323/288 |
| 2015/0214827 A1* | 7/2015 | Yoon | H02M 1/14 | 323/286 |
| 2015/0378386 A1* | 12/2015 | Li | H03F 3/4508 | 330/252 |
| 2016/0087595 A1* | 3/2016 | Gopalraju | H02M 1/08 | 330/260 |
| 2016/0156319 A1* | 6/2016 | Barbieri | H03F 3/45197 | 330/257 |
| 2016/0181906 A1* | 6/2016 | Gambetta | H02M 3/156 | 323/288 |
| 2016/0259355 A1* | 9/2016 | Farber | H03K 5/2481 | |
| 2016/0261187 A1* | 9/2016 | Deng | H02M 3/1588 | |
| 2017/0003697 A1* | 1/2017 | Hsiao | G05F 1/56 | |
| 2017/0025950 A1* | 1/2017 | Wu | H02M 3/1584 | |
| 2017/0040892 A1* | 2/2017 | Rutkowski | G05F 1/618 | |
| 2017/0179824 A1* | 6/2017 | Polhemus | G01R 19/0092 | |
| 2017/0269620 A1* | 9/2017 | Duong | G05F 1/575 | |
| 2017/0279357 A1* | 9/2017 | Tajima | G01R 19/0092 | |
| 2018/0041119 A1* | 2/2018 | Zhang | H02M 1/4258 | |
| 2018/0198369 A1* | 7/2018 | Manohar | H02M 3/156 | |
| 2019/0007008 A1* | 1/2019 | Berkhout | H03K 17/162 | |
| 2019/0097587 A1* | 3/2019 | Vasan | H03F 3/45094 | |
| 2019/0108934 A1* | 4/2019 | Nagasaki | F16K 11/07 | |
| 2019/0140638 A1* | 5/2019 | Ferianz | H03K 17/687 | |
| 2019/0273471 A1* | 9/2019 | Ahmed | H03F 3/45183 | |
| 2019/0305679 A1* | 10/2019 | Jiang | H02M 3/158 | |
| 2019/0327527 A1* | 10/2019 | Montgomery | H04N 21/4753 | |
| 2020/0007089 A1* | 1/2020 | Ahmed | H03F 3/45183 | |
| 2020/0012303 A1* | 1/2020 | Stanzione | G05F 1/565 | |
| 2020/0021189 A1* | 1/2020 | Li | H02M 3/158 | |
| 2020/0076303 A1* | 3/2020 | Särkkä | H02M 3/158 | |
| 2020/0204127 A1* | 6/2020 | Rito | H03G 1/04 | |
| 2020/0212861 A1* | 7/2020 | Friend | H03F 3/211 | |
| 2020/0389091 A1* | 12/2020 | Chen | G05F 1/62 | |
| 2021/0091678 A1* | 3/2021 | Wang | H02M 1/4208 | |
| 2021/0111681 A1* | 4/2021 | Särkkä | H03F 3/45183 | |
| 2021/0126524 A1* | 4/2021 | Wiktor | H02M 1/36 | |
| 2021/0296995 A1* | 9/2021 | Zhang | H02M 3/158 | |
| 2021/0344310 A1* | 11/2021 | Zanbaghi | H03F 3/2173 | |
| 2021/0384830 A1* | 12/2021 | Bertolini | H02M 1/0025 | |
| 2022/0029541 A1* | 1/2022 | Rosenbaum | H03F 1/0227 | |
| 2022/0057469 A1* | 2/2022 | Fortuny | G01R 1/30 | |
| 2022/0091625 A1* | 3/2022 | Luo | H02M 3/158 | |
| 2022/0094318 A1* | 3/2022 | Dal Bianco | H02M 3/156 | |
| 2022/0109413 A1* | 4/2022 | Danyuk | H03F 3/45475 | |

(56) References Cited

U.S. PATENT DOCUMENTS

2022/0158555 A1* 5/2022 Jovanovic ........... H02M 1/0025
2022/0166230 A1* 5/2022 Tseng .................. H02J 7/00041
2022/0166320 A1* 5/2022 Brambilla ........... H02M 1/0009

* cited by examiner

HIGH SPEED, LOW QUIESCENT CURRENT COMPARATOR

CROSS-REFERENCE TO RELATED APPLICATION

This application claims the benefit of U.S. Provisional Application No. 63/071,771 filed Aug. 28, 2020, the content of which is hereby incorporated herein by reference in its entirety.

BACKGROUND

Unless otherwise indicated herein, the materials described in this section are not prior art to the claims in this application and are not admitted to be prior art by inclusion in this section.

A DC-DC switching converter to converts electrical power from a DC source to DC loads, such as a processor, while converting voltage and current characteristics. Voltage regulation is achieved by varying the ratio of on-to-off time (also known as duty cycles) of switching elements, such as transistors. In the case of a buck converter, a higher source DC voltage may be converted to a lower DC voltage at the load. The transistors of a switching converter continually switch between full-on and full-off states. A feedback circuit monitors the output voltage and compares it with a reference voltage. In some cases, an additional feedback loop that senses peak inductor current may be used to provide additional control of the switching converter output (e.g., a current-mode buck converter). The additional closed-loop current sense feedback may limit the operational frequency of the converter.

SUMMARY

Aspects of the present disclosure relate to power supplies, and more particularly, though not necessarily exclusively, high speed current capacitors for DC-DC switching converters.

According to various aspects there is provided an integrated circuit device. In some aspects, the integrated circuit device may include: an input stage configured to receive a first input signal and a second input signal and generate a first voltage based on the first input signal and generate a second voltage based on the second input signal; an amplification stage configured to generate a first output current based on the first voltage and generate a second output current based on the second voltage; a bias stage configured to generate a bias voltage for the amplification stage based on the first voltage and the second voltage; a load stage configured to output a differential voltage signal based on a comparison of the first output current and the second output current, wherein the differential voltage signal is proportional to a current through a device for which current is sensed; and an output stage configured to output a signal to control a duty cycle of the device for which current is sensed based on the differential voltage signal generated by the load stage.

According to various aspects there is provided a switching voltage converter. In some aspects, the switching voltage converter may include: a first switching device and a second switching device, the first switching device and the second switching device operable to switch a first voltage at a first voltage value to generate a second voltage at a second voltage value; a modulator configured generate a duty cycle for the first switching device and the second switching device; and a current detection device configured to receive a first voltage signal from a first terminal of the first switching device and a second voltage signal from a second terminal of the first switching device.

The current detection device may include: an input stage configured to receive the first voltage signal and the second voltage signal and generate a first voltage based on the first voltage signal and generate a second voltage based on the second voltage signal; an amplification stage configured to generate a first output current based on the first voltage and generate a second output current based on the second voltage; a bias stage configured to generate a bias voltage for the amplification stage based on the first voltage and the second voltage; a load stage configured to output a differential signal based on a comparison of the first output current and the second output current, wherein the differential signal is proportional to a current through the first switching device; and an output stage configured to output a signal to control a duty cycle of the first switching device based on the differential signal generated by the load stage.

According to various aspects there is provided a method for controlling peak inductor current for a switching voltage converter. In some aspects, the method may include: operating a first switching device and a second switching device to switch a first voltage at a first voltage value to generate a second voltage at a second voltage value; detecting, by a current detection device, a first voltage signal from a first terminal of the first switching device and a second voltage signal from a second terminal of the first switching device. The current detection device may include: an input stage configured to receive the first voltage signal and the second voltage signal and generate a first voltage based on the first voltage signal and generate a second voltage based on the second voltage signal; an amplification stage configured to generate a first output current based on the first voltage and generate a second output current based on the second voltage; a bias stage configured to generate a bias voltage for the amplification stage based on the first voltage and the second voltage; a load stage configured to output a differential signal based on a comparison of the first output current and the second output current, wherein the differential signal is proportional to a current through the first switching device; and an output stage configured to output a control signal. The method may further include receiving, by a modulator, the control signal to control a duty cycle of the first switching device based on the differential signal generated by the load stage.

BRIEF DESCRIPTION OF THE DRAWINGS

Various embodiments in accordance with the present disclosure will be described with reference to the drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

According to aspects of the present disclosure, an integrated circuit device that can improve detection of inductor current in a current mode switching converter is provided. Closed loop current sensing for switching converters operating at high frequencies may be impractical due to the limitations in the operating speed of the feedback circuit and power consumption requirements. Techniques according to the present disclosure may sense the inductor current in open loop mode and with higher speed, higher accuracy, and lower power consumption for the control loop.

Some aspects of the present disclosure can provide an integrated circuit current comparator that may improve the operational speed and reduce the power consumption of the current feedback loop compared to the conventional closed loop current control by utilizing open loop operation for sensing the peak inductor current. The current comparator may operate with a common mode voltage as high as the input supply voltage and may use low threshold voltage MOSFET devices. The operating voltages of the MOSFET devices may be maintained by generating bias voltages with respect to the supply voltage for the current comparator. The current comparator may have a duty cycled synchronized with the on time of the switching converter, which can reduce power consumption.

Figure 1:
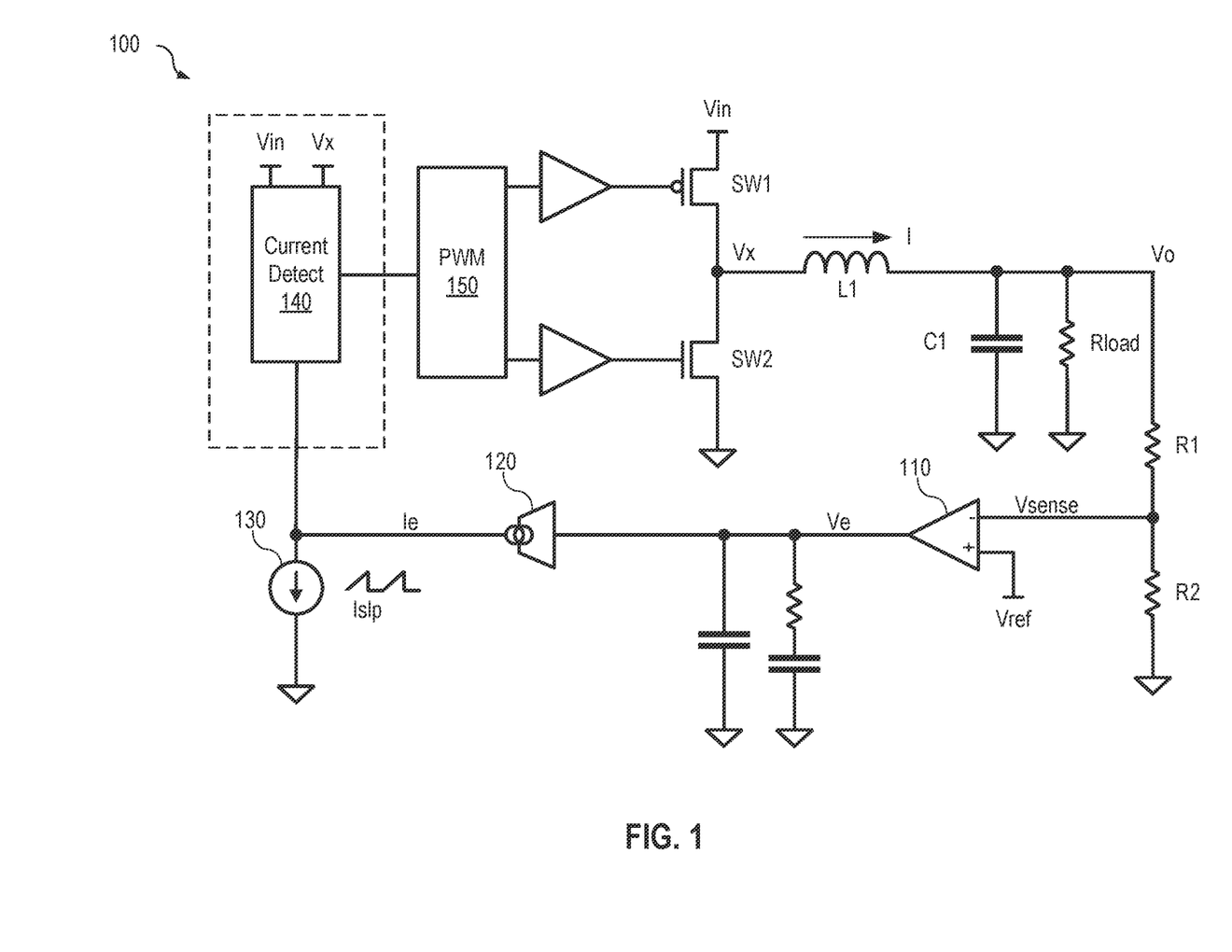
FIG. 1 is a simplified schematic diagram illustrating an example of a DC-DC synchronous buck converter according to some aspects of the present disclosure.

FIG. 1 is a simplified schematic diagram illustrating an example of a DC-DC synchronous buck converter 100 according to some aspects of the present disclosure. The synchronous buck converter utilizes two switching devices (e.g., MOSFETS or other types of switching devices) to convert a source DC voltage Vin to a lower DC voltage Vo at a load. Referring to FIG. 1, a pulse width modulator (PWM) 150 generates signals to turn on and turn off the MOSFETS SW1 and SW2 according to a duty cycle that defines a time that each MOSFET is turned on. The switching device SW1 may be a p-channel MOSFET and the switching device SW2 may be an n-channel MOSFET. The duty cycle determines an average output voltage Vo for the converter.

When the PWM 150 turns off SW2, SW1 is turned on and current I flowing through SW1 increases in the inductor L1. Some of the current I charges the capacitor C1 and some of the current is delivered to the load Rload producing an output voltage Vo. When the PWM 150 turns off SW1, the current I in the inductor L1 will be at a peak. SW2 is turned on and the current I in the inductor L1 begins to decrease. Current is delivered to the load Rload from the inductor L1 and the capacitor C1 through SW2. The output voltage Vo may be sensed, for example by a resistive voltage divider R1, R2 or by another method. A sense voltage Vsense may be compared to a reference voltage Vref by an error amplifier 110 to generate an error voltage Ve. The error voltage Ve may be converted to an error current Ie by an operational transconductance amplifier (OTA) 120, and combined with a ramp current signal Islp 130. The combined Ie and Islp signal may be input to a current detection device 140 to provide inductor peak current control for the converter 100.

Figure 2:
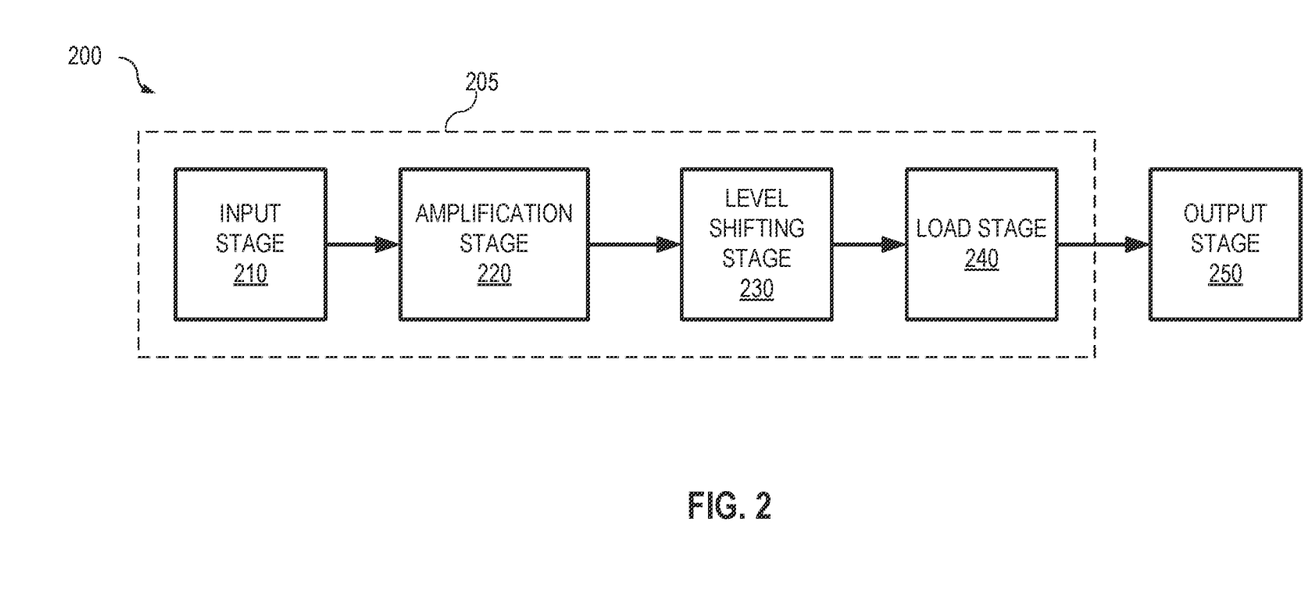
FIG. 2 is a simplified block diagram of an example of a current detection device according to some aspects of the present disclosure.

According to aspects of the present disclosure, a current detection device including a current comparator may detect peak current in the inductor and provide a signal to the PWM to control the duty cycle of the switching devices (e.g., SW1 and SW2 in FIG. 1). FIG. 2 is a simplified block diagram of an example of a current detection device 200 according to some aspects of the present disclosure. The current detection device 200 may include a current comparator 205 and an output stage 250. The current comparator 205 may include an input stage 210, an amplification stage 220, a level shifting stage 230, and a load stage 240.

With reference to FIG. 1, the input stage 210 may receive the input voltage Vin to the converter and a voltage Vx at a point between the switching devices SW1, SW2. The input stage 210 may generate voltages proportional to the voltage Vin and the voltage Vx. The amplification stage 220 may amplify the generated voltages and generate output currents proportional to the amplified voltages. The load stage 240 may compare the currents generated by the amplification stage 220 and generate a differential output voltage. The output stage 250 may generate a single-ended output signal from the differential output voltage. The output stage 250 may increase the gain of the output signal while providing high bandwidth. The output signal may be provided as a control signal to the pulse width modulator (e.g., the PWM 150) to control the duty cycle of the switching devices (e.g., the switching devices SW1, SW2). The level shifting stage 230 may provide a voltage level shift between the amplification stage 220 and the load stage 240 to prevent voltage stress on the amplification stage.

Figure 3:
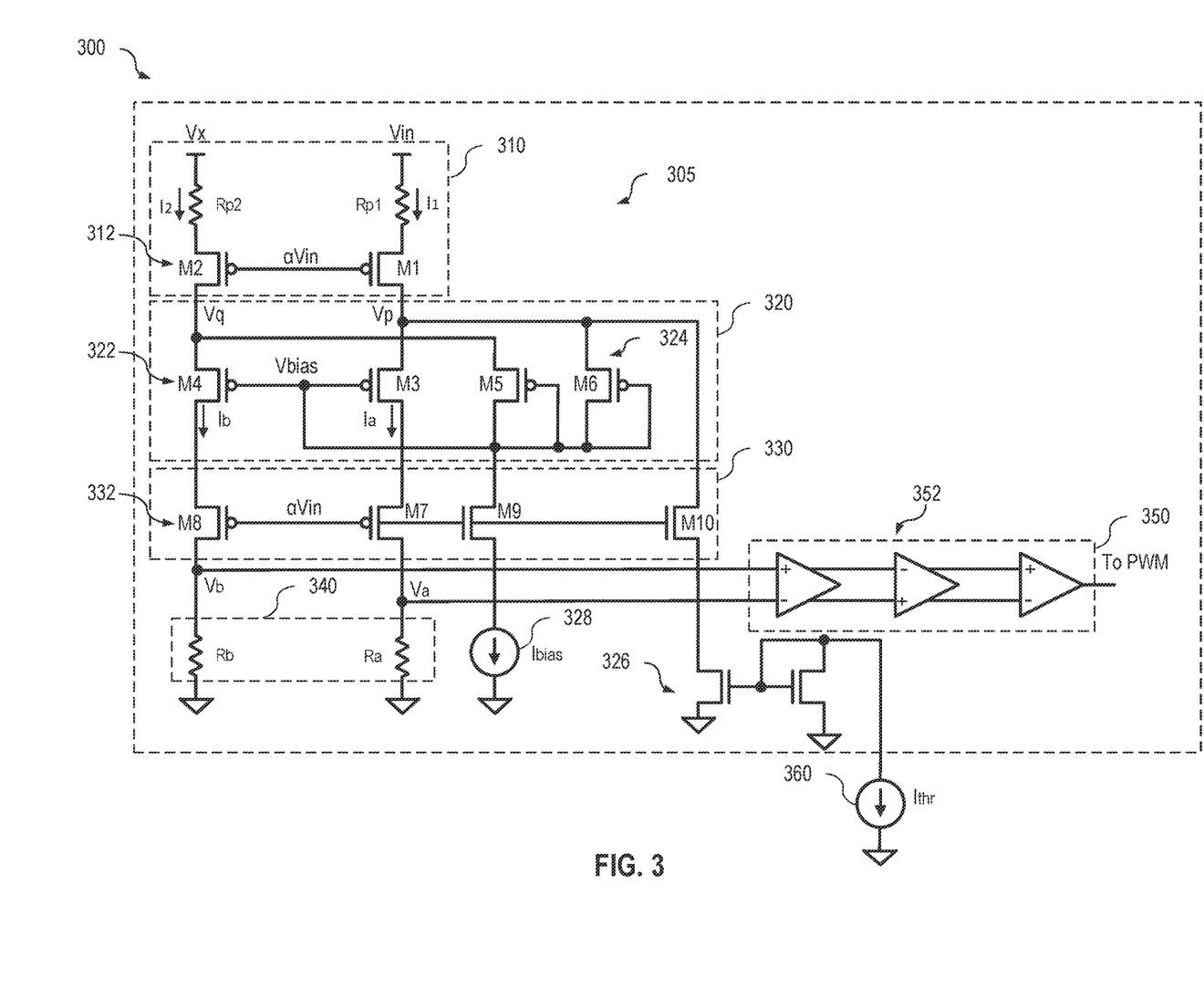
FIG. 3 is a simplified schematic diagram of an example of a current detection device according to some aspects of the present disclosure.

FIG. 3 is a simplified schematic diagram of an example of a current detection device 300 according to some aspects of the present disclosure. The current detection device 300 may include an input stage 310, an amplification stage 320, a level shifting stage 330, a load stage 340, and an output stage 350. According to some aspects of the present disclosure, the input stage 310, the amplification stage 320, the level shifting stage 330, and the load stage 340 may form a current comparator 305.

Figure 4:
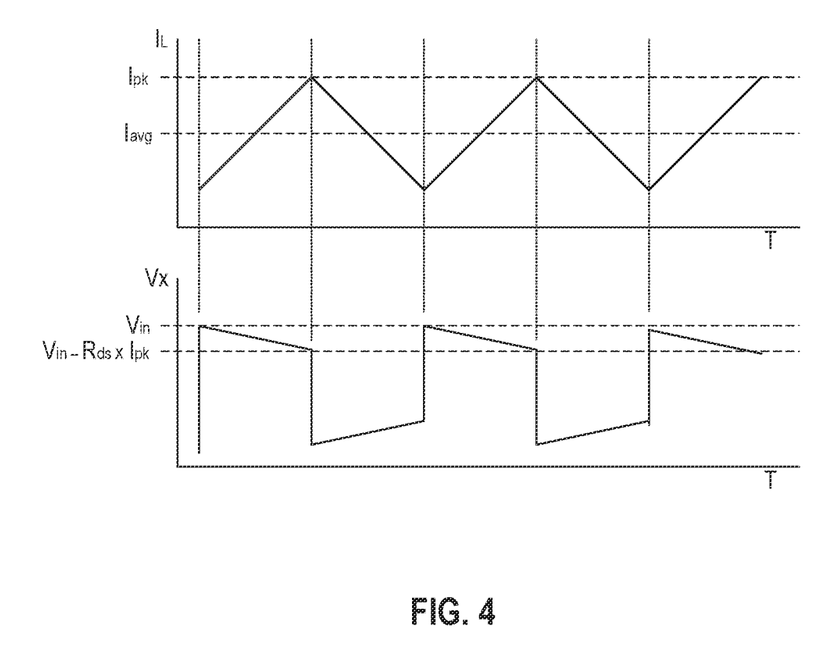
FIG. 4 is a diagram illustrating an example of an inductor current waveform and a Vx voltage waveform according to some aspects of the present disclosure.

The voltage inputs to the input stage 310 may be the input voltage Vin of the converter and the voltage Vx at a point between the switching devices SW1, SW2 as shown in FIG. 1. The switching device SW1 may be a p-channel MOSFET and the switching device SW2 may be an n-channel MOSFET. When SW1 is turned on by the PWM, current will begin to flow in the inductor L1 causing current to flow in SW1 resulting in a voltage drop across SW1 such that the voltage Vx may be lower than the voltage Vin. FIG. 4 is a diagram illustrating an example of an inductor current waveform and a Vx voltage waveform according to some aspects of the present disclosure.

As shown in FIG. 4, when SW1 is turned on, the voltage Vx may rise to the input voltage Vin. As the inductor current $I_L$ ramps up to a peak inductor current $I_{pk}$, a voltage drop may be developed across the switching device SW1 caused by the current flowing through a resistance between the source and drain (Rds) of the device SW1. The voltage drop across SW1 may be proportional to the current flowing through SW1, which is also the current flowing in the inductor L1. The current $I_L$ flowing through SW1 may cause the voltage at Vx to drop to a value of $V_{in} - I_L \times R_{ds}$.

Referring again to FIG. 3, the voltage Vin may be input to the source terminal of the current sense MOSFET M1 through a low valued (e.g., less than 100Ω) resistor Rp1. The voltage Vx may be input to the source terminal of the current sense MOSFET M2 through a low valued (e.g., less than 100Ω) resistor Rp2. The source-drain resistances (Rds) of MOSFETs M1 and M2 may be scaled to the source-drain resistance of the switching device SW1 such that the inductor current $I_L$ may be proportional to the voltage difference Vin minus Vx at M1 and M2. Thus, the voltage difference Vp minus Vq at the current detection device 300 may be proportional to the voltage drop across SW1 in FIG. 1.

The input stage 310 may also include a first common base transistor stage 312 including the current sense MOSFETs M1 and M2. The MOSFETs M1 and M2 may be p-channel MOSFETs. The gate terminals of the MOSFETs M1 and M2 may be biased with a bias voltage αVin derived from the input voltage Vin of the converter. In some implementations, the factor α may be set to one-half such that the gate terminals of the first common base transistor stage 312 are biased at one-half of the input voltage Vin. In some implementations, the factor α may be set to a value different than one-half such that the gate terminals of the MOSFETs M1 and M2 may be biased at a different fraction of the input voltage Vin. In some implementations, the gate terminals of the MOSFETs M1 and M2 may be biased at ground potential. In some implementations, the factor α may depend on the gate voltage of the switching device SW1. The MOSFET M2 may operate as a switch that conducts when the switching device SW1 is turned on. The input stage 310 may develop voltages Vp and Vq at the drain terminals of M1 and M2, respectively.

A voltage drop may be developed across the MOSFET M1 caused by the current flowing through a resistance between the source and drain ($R_{ds}$) of M1. The voltage Vp may be equal to the voltage drop Vin−I1×$R_{ds}$ across M1, where I1 is the current through M1. Similarly, the voltage Vq may be equal to the voltage drop Vx−I2×$R_{ds}$ across M2, where I2 is the current through M2. The difference between the currents I1 and I2 may be proportional to the current in the inductor L1.

According to some aspects of the present disclosure, the source-drain resistances (Rds) of MOSFETs M1 and M2 may be scaled to the source-drain resistance of the switching device SW1. In some implementations the ratio of Rds of MOSFETs M1 and M2 to Rds of the switching device SW1 may be 10,000. For example, for an Rds of 50 milliohm for the switching device SW1, the Rds of MOSFETs M1 and M2 may be 500Ω. Continuing with the example, a one amp current through the switching device SW1 may generate a voltage drop of 1A×0.05Ω=50 mV, while only 100 μA would be required to produce a corresponding 50 mV drop (100 μA×500Ω) across M1 or M2. Other ratios may be used without departing from the scope of the present disclosure. Accordingly, the differential voltage Vp minus Vq may be proportional to the voltage drop Vin minus Vx across the switching device SW1, which may also be proportional to the inductor current. In this manner, the current detection device 300 may sense the inductor current.

A differential voltage developed at the output of the first common base input stage 310 may be amplified by the amplification stage 320. The amplification stage 320 may include a second common base transistor stage 322 and a gate bias stage 324. The second common base transistor stage 322 may include MOSFETs M3 and M4. The gate bias stage 324 may include MOSFETs M5 and M6. The MOSFETs M3, M4, M5, and M6 may be p-channel MOSFETs.

The second common base transistor stage 322 may amplify the output voltages (e.g., Vp, Vq) of the input stage to generate output currents Ia and Ib to the load stage 340. An external threshold current Ithr 360 generated by the voltage control loop (e.g., the resistive divider R1, R2, the error amplifier 110 and the OTA 120 in FIG. 1) may be applied to the second common base transistor stage 322 via a current mirror circuit 326 to set a threshold for a peak inductor current at the second common base transistor stage 322. The output voltage signal of the output stage 350 may change state when the voltage Vx decreases to a value that causes the value of the output current Ib to fall below the value of the output current Ia set by the threshold current Ithr.

The gate bias stage 324 may be configured to generate a bias voltage Vbias for the gate terminals of the second common base transistor stage 322. The bias voltage Vbias at the gate terminals of the MOSFETs M3 and M4 generated by the gate bias stage 324 may maintain operation of the MOSFETs M3 and M4 in the saturation region. The MOSFETs M5 and M6 of the gate bias stage 324 may be diode connected and may be biased with a current source 328. The gate bias stage 324 may generate a bias voltage for the gate terminals of the MOSFETs M3 and M4 of the second common base transistor stage 322 based on the differential voltage developed at the output (e.g., Vp, Vq) of the input stage 310. Thus, operation of the current comparator 305 may be independent of an externally generated bias voltage.

The level shifting stage 330 may protect the amplification stage 320 from excessive voltage stress. The level shifting stage 330 may include a third common base MOSFET stage 332. The third common base MOSFET stage 332 may include MOSFETs M7, M8, M9, and M10. MOSFETs M7 and M8 may be p-channel MOSFETs, and MOSFETs M9 and M10 may be n-channel MOSFETs. The gate terminals of the MOSFETs M7, M8, M9, and M10 may be biased with a bias voltage αVin derived from the input voltage Vin of the converter. In some implementations, the factor α may set to one-half such that the gate terminals of the third common base transistor stage 332 are biased at one-half of the input voltage Vin. In some implementations, the factor α may be set to a value different than one-half such that the gate terminals of the MOSFETs M7, M8, M9, and M10 may be biased at a different fraction of the input voltage Vin. In some implementations, the gate terminals of the MOSFETs M7, M8, M9, and M10 may be biased at ground potential. In some implementations, the factor α may depend on the gate voltage of the switching device SW1.

The MOSFETs M7, M8, M9, and M10 may be fabricated as higher voltage devices than the MOSFETs M1-M6. For example, the MOSFETs M7, M8, M9, and M10 may be fabricated to operate with drain to source voltages of 1.8 V, and the MOSFETs M1-M6 may be fabricated to operate with drain to source voltages of 0.9 V. The higher voltage devices may provide protection for the lower voltage devices MOSFETs M1-M6, while the lower voltage devices may operate at higher frequencies (e.g., 250-300 Mhz) to perform the current comparison. It should be appreciated that the MOSFETs M1-M10 may be fabricated to operate at other drain to source voltages without departing from the scope of the present disclosure.

The load stage 340 may convert the current generated by the amplification stage 320 into a differential voltage to drive the output stage 350. The load stage 340 may include a first resistor Ra and a second resistor Rb. The first resistor Ra may convert the current Ia generated by the amplification stage 320 based on the input voltage Vin into a first output voltage Va. The second resistor Rb may convert the current Ib generated by the amplification stage 320 based on the input voltage Vx into a second output voltage Vb.

The current comparator 305 may generate the output voltages Va and Vb based on currents Ia and Ib generated by the amplification stage 320. The currents Ia and Ib may be scaled by a specified ratio to the current through the inductor L1, where the current through the inductor L1 is determined by the voltage drop Vin minus Vx (e.g., the drain to the source) of SW1, as shown in FIG. 1. The ratio may be determined by ratio of the source-drain resistances (Rds) of current sense MOSFETs M1 and M2 to the source-drain resistance of the switching device SW1.

The output stage 350 may include a plurality of voltage comparators 352. The output stage 350 may receive the differential output voltages Va and Vb generated by the current comparator 305. The output stage 350 may convert the differential output voltages Va and Vb into a single-ended output voltage. The single-ended output voltage of the output stage 350 may be applied as a control signal to the PWM to control the duty cycle of the switching devices SW1 and SW2. Each successive voltage comparator of the plurality of voltage comparators 352 may increase the gain of the differential output voltages Va and Vb while maintaining a high frequency response.

Figure 5:
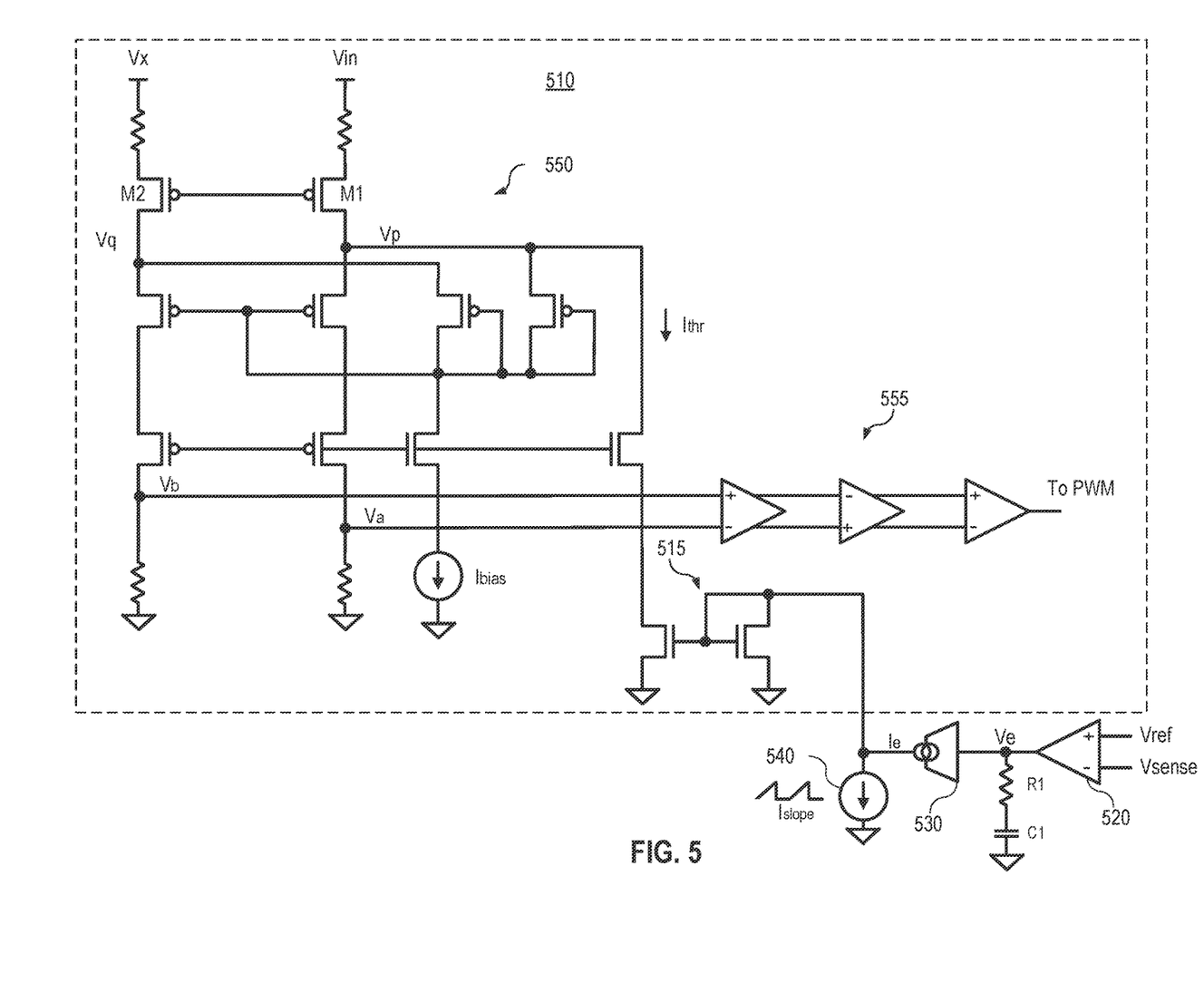
FIG. 5 is a simplified schematic diagram illustrating an example of a current detection device for a switching converter according to some aspects of the present disclosure.

FIG. 5 is a simplified schematic diagram illustrating an example of a current detection device 510 for a switching converter according to some aspects of the present disclosure. The current detection device 510 may be the current detection device 140 or the current detection device 300. The switching converter may be, for example, the switching converter 100 of FIG. 1. Referring to FIG. 1, the error amplifier 520 may be the error amplifier 110. The OTA 530 may be the OTA 120. The current source 540 may be the current source 130.

Referring to FIGS. 1 and 5, control for the switching converter may be provided via a voltage control loop by sensing the output voltage Vo and the peak inductor current. The output voltage Vo may be sensed, for example by the voltage divider R1, R2. A sense voltage Vsense may be compared to a reference voltage Vref by the error amplifier 520 to generate an error voltage Ve. The error voltage Ve may be converted to an error current Ie by the operational transconductance amplifier (OTA) 530, and combined with a ramp current signal Islope generated by the current source 540. The combined Ie and Islope signal may be input to the current detection device 510 via the current mirror circuit 515 to provide a threshold for peak current control for the converter 100.

The peak current in the inductor L1 may be sensed based on the voltage difference between Vin and Vx across the resistance Rds of the switching device SW1. The voltage Vin may be applied to the source terminal of MOSFET M1 of the current detection device 510 and the voltage Vx may be applied to the source terminal of MOSFET M2 of the current detection device 510. The MOSFETS M1 and M2 form the input stage of the current comparator 550 of the current detection device 510, and may have their source-drain resistances (Rds) scaled to the source-drain resistance of the switching device SW1. For example, the ratio of Rds of MOSFETs M1 and M2 to Rds of the switching device SW1 may be 10,000. Thus, for an Rds of 50 milliohm for the switching device SW1, the Rds of MOSFETs M1 and M2 may be 500Ω. Accordingly, a one amp current through the switching device SW1 may generate a voltage drop of 1A×0.05Ω=50 mV, while the same 50 mV drop would be produced across M1 or M2 with only 100 μA (100 μA×500Ω=50 mV). Accordingly, the differential voltage Vp minus Vq across the drain terminals of M1 and M2 may be proportional to the voltage drop Vin minus Vx across the switching device SW1, which may also be proportional to the inductor current.

A threshold current Ithr (e.g., the combined Ie and Islope signal) may be input to the current comparator 550 at the drain terminal of the MOSFET M1 to affect the voltage Vp at the output of the input stage. The threshold current Ithr may set the peak value of inductor current. As the inductor current increases, Vx decreases causing Vq to also decrease. When the value of Vq drops below the value of Vp determined by the threshold current Ithr, the current comparator 550 may cause the output of the comparators of the output stage 555 to change state and transmit a control signal to the PWM to control the duty cycle of the switching devices SW1 and SW2.

Figure 6:
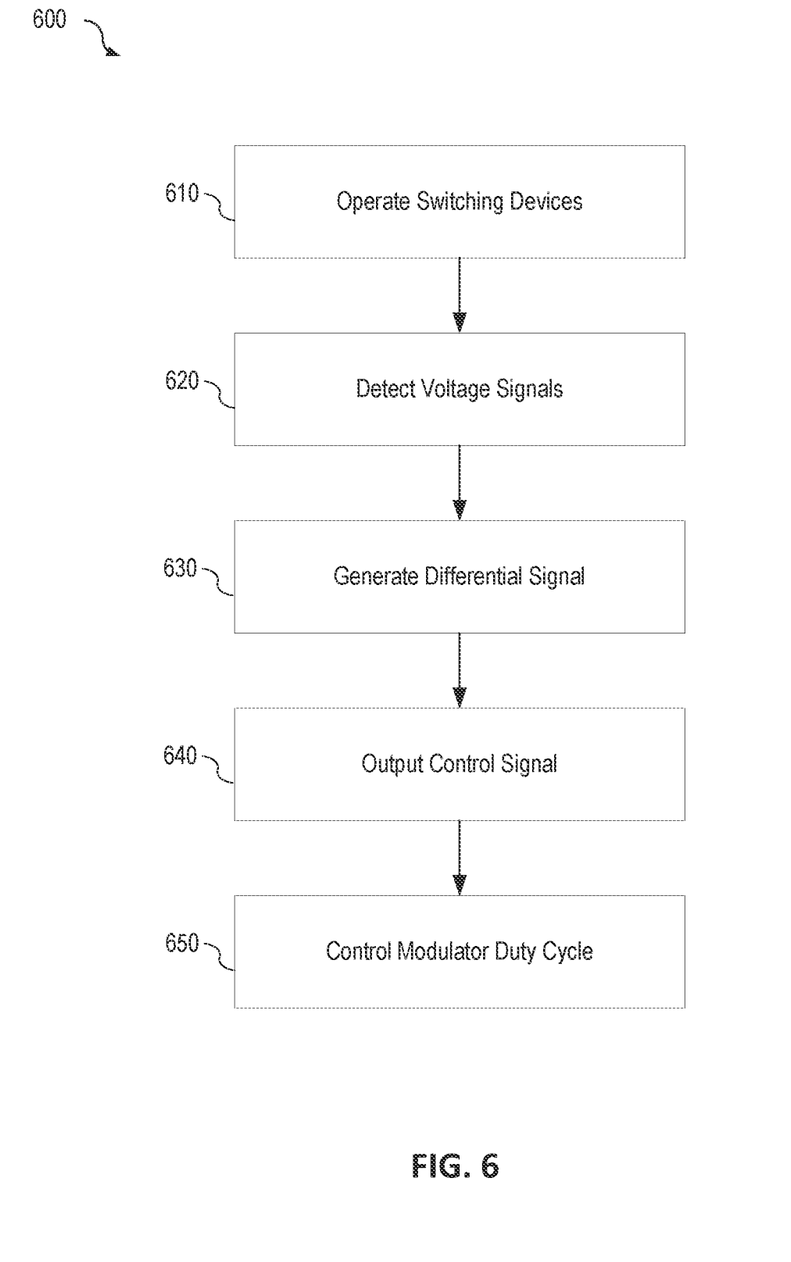
FIG. 6 is a flowchart of an example of a method for controlling peak inductor current for a switching voltage converter according to some aspects of the present disclosure.

FIG. 6 is a flowchart of an example of a method 600 for controlling peak inductor current for a switching voltage converter according to some aspects of the present disclosure. Referring to FIG. 6, at block 610, switching devices of the switching voltage converter may be operated. A first switching device and a second switching device may be operated to switch a first voltage at a first voltage value to generate a second voltage at a second voltage value. Current flowing through the first switching device when the first switching device is in the on state may provide current to an inductor of the switching voltage converter.

At block 620, voltage signals may be detected. A first voltage signal from a first terminal of the first switching device and a second voltage signal from a second terminal of the first switching device may be detected. A current detection device may receive the first voltage signal from a first terminal of the first switching device and may receive the second voltage signal from a second terminal of the first switching device. The first voltage signal may be an input voltage an input voltage for switching voltage converter and the second voltage signal may correspond to a voltage drop across the first switching device. The current detection device may generate a first voltage based on the first voltage signal and generate a second voltage based on the second voltage signal.

At block 630, a differential signal is proportional to a current through the first switching device may be generated. The current detection device may generate a differential signal that is proportional to a current through the first switching device. A current detection device may convert first output current generated from the first voltage and a second output current generated from the second voltage to a differential voltage signal. The differential voltage signal may be proportional to the inductor current.

At block 640, a control signal may be output to a modulator. The current detection device may convert the differential voltage signal to a single ended control signal for a modulator. The modulator may be a pulse width modulator.

At block 650, the duty cycle of the modulator may be controlled. The modulator may receive the control signal. The control signal may control the duty cycle of the pulse width modulator to control the peak current in the inductor.

The specific operations illustrated in FIG. 6 provide a particular method for controlling peak inductor current for a switching voltage converter according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 6 may include multiple sub-operations that may be performed in various sequences as appropriate to the individual operation. Furthermore, additional operations may be added or removed depending on the particular applications.

Embodiments of the current detection device including the current comparator according to the present disclosure may sense inductor current in an open loop mode, at higher speed (e.g., 250-300 Mhz), and with less power consumption due to lower quiescent current (e.g., micro-amps rather than milliamps for conventional control loops) for the control loop of the switching converter. Operation may be independent of the supply rail voltages, and self-generated bias voltages may maintain linear operation and eliminate a need for external bias voltages While the current detection device including the current comparator of the present disclosure has been described with respect to a switching power converter, the current detection device and/or the current comparator is not limited to this application. The current detection device and/or the current comparator of the present disclosure can be utilized in any application where a fast, low quiescent current, current comparison is desired.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

What is claimed is:

1. An integrated circuit device, comprising:
   an input stage configured to receive a first input signal and a second input signal and generate a first voltage based on the first input signal and generate a second voltage based on the second input signal;
   an amplification stage configured to generate a first output current based on the first voltage and generate a second output current based on the second voltage;
   a bias stage configured to generate a bias voltage for the amplification stage based on the first voltage and the second voltage;
   a load stage configured to output a differential voltage signal based on a comparison of the first output current and the second output current, wherein the differential voltage signal is proportional to a current through a device for which current is sensed; and
   an output stage configured to output a signal to control a duty cycle of the device for which current is sensed based on the differential voltage signal generated by the load stage.

2. The integrated circuit device of claim 1, wherein the input stage comprises:
   a first MOSFET device configured to receive the first input signal and sense a first input current resulting from the first input signal; and
   a second MOSFET device configured to receive the second input signal and sense a second input current resulting from the second input signal,
   wherein the first input current and the second input current are sensed based on a resistance parameter of the first MOSFET device and a resistance parameter of the second MOSFET device, respectively.

3. The integrated circuit device of claim 2 wherein the resistance parameter of the first MOSFET device and the resistance parameter of the second MOSFET device are scaled to a resistance parameter of the device for which current is sensed.

4. The integrated circuit device of claim 3, wherein a ratio of the resistance parameter for the first MOSFET device and the second MOSFET device to resistance parameter of the device for which current is sensed is 10000.

5. The integrated circuit device of claim 2, wherein the first output current is proportional to the first sensed input current, and
   the second output current is proportional to the second sensed input current.

6. The integrated circuit device of claim 1, further comprising:
   a current source configured to provide a current to the amplification stage,
   wherein the current sets a threshold value for a comparison of the first output current and the second output current.

7. The integrated circuit device of claim 6, wherein when a value of the second output current falls below the threshold value, a voltage value of the output signal from the output stage changes state.

8. A switching voltage converter, comprising:
   a first switching device and a second switching device, the first switching device and the second switching device operable to switch a first voltage at a first voltage value to generate a second voltage at a second voltage value;
   a modulator configured generate a duty cycle for the first switching device and the second switching device; and
   a current detection device configured to receive the first voltage signal from a first terminal of the first switching device and the second voltage signal from a second terminal of the first switching device, the current detection device including:
      an input stage configured to receive the first voltage signal and the second voltage signal and generate a first voltage based on the first voltage signal and generate a second voltage based on the second voltage signal;
      an amplification stage configured to generate a first output current based on the first voltage and generate a second output current based on the second voltage;
      a bias stage configured to generate a bias voltage for the amplification stage based on the first voltage and the second voltage;
      a load stage configured to output a differential signal based on a comparison of the first output current and the second output current, wherein the differential signal is proportional to a current through the first switching device; and
      an output stage configured to output a signal to control a duty cycle of the first switching device based on the differential signal generated by the load stage.

9. The switching voltage converter of claim 8, wherein the input stage comprises:

a first MOSFET device configured to receive the first voltage signal and sense a first input current resulting from the first voltage signal; and a second MOSFET device configured to receive the second voltage signal and sense a second input current resulting from the second voltage signal, wherein the first input current and the second input current are sensed based on a resistance parameter of the first MOSFET device and a resistance parameter of the second MOSFET device, respectively.

10. The switching voltage converter of claim 9, wherein the resistance parameter of the first MOSFET device and the resistance parameter of the second MOSFET device are scaled to a resistance parameter of the first switching device.

11. The switching voltage converter of claim 10, wherein a ratio of the resistance parameter for the first MOSFET device and the second MOSFET device to resistance parameter of the first switching device is 10000.

12. The switching voltage converter of claim 9, wherein the first output current is proportional to the first sensed input current, and the second output current is proportional to the second sensed input current.

13. The switching voltage converter of claim 8, wherein the current detection device further comprises:

a current source configured to provide a current to the amplification stage, wherein the current sets a threshold value for a comparison of the first output current and the second output current.

14. The switching voltage converter of claim 13, wherein when a value of the second output current falls below the threshold value, a voltage value of the output signal from the output stage changes state.

15. A method for controlling peak inductor current for a switching voltage converter, the method comprising:

operating a first switching device and a second switching device to switch a first voltage at a first voltage value to generate a second voltage at a second voltage value;

detecting, by a current detection device, the first voltage signal from a first terminal of the first switching device and the second voltage signal from a second terminal of the first switching device, the current detection device including:

an input stage configured to receive the first voltage signal and the second voltage signal and generate a first voltage based on the first voltage signal and generate a second voltage based on the second voltage signal;

an amplification stage configured to generate a first output current based on the first voltage and generate a second output current based on the second voltage;

a bias stage configured to generate a bias voltage for the amplification stage based on the first voltage and the second voltage;

a load stage configured to output a differential signal based on a comparison of the first output current and the second output current, wherein the differential signal is proportional to a current through the first switching device; and an output stage configured to output a control signal; and receiving, by a modulator, the control signal to control a duty cycle of the first switching device based on the differential signal generated by the load stage.

16. The method of claim 15, wherein the control signal changes state based on a threshold value for a peak inductor current.

17. The method of claim 16, wherein the threshold value for the peak inductor current is variable based on a third current.

18. The method of claim 17, wherein the third current is periodic ramp current.

19. The method of claim 15, wherein the first voltage is generated by a first voltage drop across a first sensing device caused by a first current, and wherein the second voltage is generated by a second voltage drop across a second sensing device caused by a second current.

20. The method of claim 15, wherein specified parameters of the first sensing device and the second sensing device cause the first voltage drop and the second voltage drop to be proportional to a voltage drop across the first switching device.

* * * * *